United States Patent [19]

Shannon

[11] 4,179,303

[45] Dec. 18, 1979

[54] METHOD OF PRODUCING STRUCTURAL INSULATION MATERIALS CONTAINING AT LEAST 50 PERCENT XONOTLITE

[75] Inventor: Richard F. Shannon, Lancaster, Ohio

[73] Assignee: Owens-Corning Fiberglas Corporation, Toledo, Ohio

[21] Appl. No.: 929,638

[22] Filed: Jul. 31, 1978

[51] Int. Cl.$^2$ ............................................. C04B 15/06
[52] U.S. Cl. .................................... 106/119; 106/120
[58] Field of Search ................................ 106/119, 120

[56] References Cited

U.S. PATENT DOCUMENTS

| | | | |
|---|---|---|---|
| 3,317,643 | 5/1967 | Denny | 106/120 |
| 3,574,113 | 4/1971 | Shannon | 106/120 |
| 3,902,913 | 9/1975 | Helser et al. | 106/119 |

Primary Examiner—James Poer
Attorney, Agent, or Firm—Ronald C. Hudgens; Charles F. Schroeder; William P. Hickey

[57] ABSTRACT

A thermal insulation material of approximately 50 percent or more xonotlite binder is caused to thicken without asbestos, diatomaceous earth, or clay by the use of wood pulp dispersed around a three dimensional monofilament network of glass fibers in a slurry having a water to solids ratio of no more than approximately four. The wood pulp and other constituents of the slurry must be essentially devoid of soluble aluminum ions.

6 Claims, No Drawings

METHOD OF PRODUCING STRUCTURAL INSULATION MATERIALS CONTAINING AT LEAST 50 PERCENT XONOTLITE

BACKGROUND OF THE INVENTION

The present invention relates to a new and improved method of producing structural insulation containing approximately fifty or more percent xonotlite.

Calcium silicate type thermal insulation materials have been made for a great number of years and are of two general crystalline types, i.e. xonotlite and tobermorite. Tobermorite has five molecules of water per molecule of calcium silicate, while xonotlite has only one molecule of water per molecule of calcium silicate. Xonotlite can stand temperatures of approximately 1,800° F. while tobermorite is limited to a range of approximately 1,200° F. Xonotlite materials require more autoclaving to produce and are more costly so that by far the bulk of the inorganic insulation materials which have been produced were of the tobermorite type. Xonotlite and tobermorite insulation materials are made from water rich slurries of lime, silica, fillers, and fibrous reinforcements which are caused to thicken into a gel that holds the excess water suspended. The thickened materials are either poured into molds to precrystallize or are precrystallized and then filtered into the desired finished shape. The precrystallized or prehardened materials are then placed into an autoclave where they are heated under pressure to temperatures above 350° F. to produce the final crystalline structure, following which the excess water is evaporated to leave a lightweight porous insulation material. It is imperative that the slurry thickens into a gel to hold excess water uniformly throughout the materials, which when evaporated, gives voids therein to increase the insulating value and lighten the product. The gel formation keeps material from shifting in the molds in the pan cast process and helps cause filter pressed material to retain their shape so that they can be handled and put into an autoclave.

Up until recently, asbestos has been the only material that has been used as a reinforcement, because the highly branched nature of asbestos suspends the solids in the slurry better than any known material. Recently, there has been efforts to produce the insulation without the asbestos. The Helser-Shannon U.S. Pat. No. 3,902,913 teaches how an insulation material can be made by using a combination of wood pulp, alkali resistant glass fibers, and diatomaceous earth.

According to principles of the present invention, it has been determined that xonotlite does not form in the presence of free aluminum ions. It is believed that calcium aluminum silicates will not form hydrates having but a single crystal of water, and that this may account for the reason that aluminum salts, or materials containing aluminum ions, poison the reaction to xonotlite. Diatomaceous earth and clay produce a thickening or a gelling reaction. It has been determined that diatomaceous earth, and clay, contain sufficient free aluminum ions that they poison the xonotlite reaction. Prior to the present invention, therefore, there was no known way of thickening or pregelling a xonotlite forming slurry at ambient conditions. According to principles of the present invention, a process has now been provided for making xonotlite without using asbestos, or gel forming ingredients that poison or inhibit the formation of xonotlite crystals.

DESCRIPTION OF THE PREFERRED EMBODIMENTS

It has been discovered that it is possible to thicken calcium silicate forming slurries without forming a gel, as is produced by the presence of diatomaceous earth or clay which contain harmful aluminum ions. The discovery having been made, it is now theorized that if a slurry is made from only ingredients which are negatively charged, the particles will mutually repel each other to such an extent that a thixotropic mixture is produced. By keeping the water to solids ratio below approximately 4.0 to 1, the mixture is sufficiently thick that it will not slop out of a mold when pan poured, and will be handleable when filter pressed into a solid shape. In order that this can be accomplished, it is necessary that the glass fibers be negatively charged and not contain interfering coatings. The wood pulp that is used must not be treated so that it is positively charged; and the silica which is used for the reaction must be free of soluble aluminum ions. Diatomaceous earth cannot be used, since it contains sufficient aluminum ions to prevent the thickening reaction of the present invention. Hydrated lime, of course, once slaked, is negatively charged; and when the water to solids ratio is lower than approximately 4 to 1, the negative charge on all of the slurry forming materials is sufficient to hold the solid materials suspended throughout the mixture. Substantially all positive trivalent ions must be kept out of the slurry in order for the phenomenon of the present invention to occur. Since alumina is so prevalent in the earth's crust, the raw siliceous materials must be selected so that they are free of soluble aluminum ions. Applicant knows of no diatomaceous earth that is sufficiently free of soluble aluminum ions that it can be used in the process of the present invention. The glass fibers that are used must be present in monofilament form in a weight percentage for H filament (0.00040 to 0.00045 in. diam.) that is at least one percent by weight of solids and preferably above two percent glass monofilament. The wood pulp used should be between approximately 1 and 10 percent by weight.

Although the present invention can be used to thicken any type of calcium silicate forming slurries, it will have its greatest utility in forming xonotlite since other means exist for producing tobermorite materials without using asbestos. Because xonotlite cannot be made when aluminum ions are present in approximately more than 0.01 percent, the present invention will have utility in producing mixtures of tobermorite and xonotlite in addition to producing pure xonotlite.

The following table gives slurry formulations for forming xonotlite or mixtures of xonotlite and tobermorite:

| Materials | Percent/Weight | | | |
| --- | --- | --- | --- | --- |
| | Ex. 1 | Ex. 2 | Ex. 3 | Ex. 4 |
| Wood pulp | 2.0 | 2.0 | 2.0 | 2.0 |
| Glass fiber | 3.0 | 3.0 | 3.0 | 2.0 |
| Organic fiber | 0.0 | 0.0 | 1.0 | 0.0 |
| Dust (filler) | 7.5 | 0.0 | 0.0 | 0.0 |
| Opacifier (iron chromite) | 3.0 | 3.0 | 3.0 | 3.0 |
| Portland cement | — | 30.0 | 21.0 | — |
| Quicklime | 40.0 | 25.0 | 30.0 | 46.0 |
| Tripoli | 44.5 | 37.0 | 40.0 | 47.0 |

-continued

| Materials | Percent/Weight | | | |
|---|---|---|---|---|
| | Ex. 1 | Ex. 2 | Ex. 3 | Ex. 4 |
| C/S | .91 | .97 | .95 | .99 |
| Water to solids ratio | 3.5 | 3.5 | 3.5 | 3.0 |

Examples 2 and 4 give substantially all xonotlite and examples 1 and 3 give a blend of approximately 50% xonotlite and 50% tobermorite.

Slurries of the materials given in the table are made by hydrating the quick lime in water at a temperature of from 100° to 150° F. and preferably between 120° and 130° F. Only sufficient water is utilized to permit adequate mixing and to hydrate the lime. Thereafter, the paper pulp is mixed into the hydrated lime. The fillers, such as dust, or iron chromite, if used, are mixed into the slurry, followed by the silica and/or siliceous additives such as Portland cement, if used. Following this, chopped glass fiber strand of an alkali resistant glass are added in lengths of from one eighth to one inch. The strand has a size thereon which disintegrates in water and the strand is mixed therein for a sufficient period of time, and with sufficient agitation to distribute the strand throughout the slurry, and break the strands apart into their individual filaments. Any additional water that is required to bring the materials to the desired water to solids ratio is then added.

In the prior art processes wherein asbestos is not used, it is necessary to thicken the slurries by means of diatomaceous earth or clay to keep water from settling out prior to gelling at elevated temperatures if prehardners. With the present invention, once the materials are adequately mixed and the chopped glass strand is broken apart into its monofilaments, the slurry will be sufficiently thick that it can be poured into molds and processed immediately if the water solids ratio is below about 4.0. In Examples 1-4, the slurries are poured into flat pans approximately two inches deep, 18 inches wide and 36 inches long. Since the materials of the present invention do not preharden by gel formation, the pans are placed into racks, and the racks are rolled into an autoclave where they are processed according to the cycle given in the Helser U.S. Pat. No. 3,902,913. The materials of Examples 1, 2, and 3, when removed from the autoclave, have a density of approximately 17 pounds per cubic foot, and the material of Example 4 will have a density of approximately 20 pounds per cubic foot. The materials of Examples 1 and 3 will withstand temperatures of at least 1,500° F., and the materials of Examples 2 and 4 will stand temperatures of approximately 1,800° F.

The formulations of Examples 1-4 can be used in the filter press process also by increasing the water to solids ratio to from 6 to 1, to 8 to 1, and by preheating the mixture to produce a partially reacted material before filter pressing into the desired shape. The material is taken from the filter press and autoclaved as described above.

The wood pulp used in the examples must be essentially free of soluble aluminum ions, and must have a negative charge in water. The glass fibers that are utilized are added in the form of a strand in order that they can be adequately mixed throughout the slurry, and they must separate into monofilaments, which likewise have a water wettable negatively charged surface. It is believed that the combination of the glass monofilaments and the wood pulp produces a structure that can be linked to that of asbestos in that the glass monofilaments provide a network while the short wood pulp fibers fill the spaces between the monofilament network in a manner which can be likened to the structure of snowflakes. It will be seen that, in order to produce such structure, the wood pulp and the glass fibers must be similarly charged, and in the present instance, must be negatively charged, so that they do not agglomerate, and so that they disperse completely throughout the slurry. Organic fibers can be added for green strength, provided they likewise are free of trivalent soluble ions. The dust that is used is dust from previously made insulation material, and acts as a filler. All fillers likewise must be free of trivalent ions. The opacifier is used to increase the insulative value of the material, particulary with respect to infrared radiation. It is essentially free of trivalent soluble ions. Portland cement can be used as a source of both the calcareous and the siliceous materials, and even though it has aluminum compounds in it, the aluminum is bound up chemically so that it does not produce soluble aluminum ions. The quick lime is free of aluminum ions, as is the tripoli. It will be seen that all of the materials are not only free of trivalent aluminum ions, but they all are negatively charged in water to mutually repell each other and hold themselves suspended, provided that the water to solids ratio does not exceed approximately 4.0 to 1.

In general the calcia to silica ratio that will be used will be from 0.90 to 1.10. The amount of wood pulp may vary from approximately 2 to approximately 10 percent. The glass fibers will preferably be alkali resistant and will range from 1 percent to 10 percent and preferably more than 2 percent. Organic fibers, if used, may be used up to approximately 5 percent. Fillers, if used, may be used up to 20 percent. It is possible to use calcia and silica in a combined form as part of the requirement of each. Portland cement is one such combined form, and may be used up to 35 percent. Examples of organic fiber reinforcing materials are rayon, nylon, or dacron staple. In order that the glass fibers will withstand the highly alkaline condition in the autoclave, they should be of an alkali resistant type, preferably of the composition given in U.S. Pat. No. 3,948,673. The glass fibers used in the above examples were sized with the materials given in the Stassen U.S. Pat. No. 3,948,673.

While the invention has been described in considerable detail, I do not wish to be limited to the particular embodiments above described, and it is my intention to cover hereby all novel adaptations, modifications, and arrangements thereof of which come within the practice of those skilled in the art to which the intention relates and which fall within the purview of the following claims.

I claim:

1. The method of producing xonotlite containing structural insulation materials comprising: preparing an aqueous slurry of calcareous and siliceous materials (that are free) having less than approximately 0.01% of reaction poisoning aluminum producing ion in a calcia to silica ratio above approximately 0.90, dispersing more than 2 percent by weight of solids of a filamentizable glass strand throughout the slurry in a monofilament network having a fiber length of more than approximately one eighth inch, causing more than 1 percent by weight of solids of negatively charged wood pulp fibers free of aluminum ions to be dispersed throughout the slurry, causing all materials to be sufficiently negatively charged and the water to solids ratio to be less than approximately 4.0 to 1 to produce a thixotropic mixture, shaping the slurry and autoclaving the slurry under heat and pressure to produce the insulation.

2. The method of claim 1 wherein the slurry is produced with a water to solids ratio of less than approximately 4 to 1 and is pan cast.

3. The method of claim 1 wherein the slurry is produced with a water to solids ratio greater than 4 to 1 and is filter pressed to less than the 4.0 to 1 ratio during the shaping step.

4. The method of claim 1 wherein the calcia to silica ratio is between 0.90 and 1.10.

5. The method of claim 1 wherein the autoclaving step is carried out to produce a binder mixture that is approximately 50 percent xonotlite and 50 percent tobermorite.

6. The method of claim 1 wherein the autoclaving step is carrying out to produce an insulation capable of withstanding temperatures of 1,800° F.

* * * * *

UNITED STATES PATENT AND TRADEMARK OFFICE
CERTIFICATE OF CORRECTION

PATENT NO. : 4,179,303
DATED : December 18, 1979
INVENTOR(S) : Richard F. Shannon It is certified that error appears in the above-identified patent and that said Letters Patent are hereby corrected as shown below:

Delete "(that are free)" as it appears in column 4 of the patent at line 58.

Signed and Sealed this

Sixth Day of May 1980

[SEAL]

Attest:

SIDNEY A. DIAMOND

Attesting Officer     Commissioner of Patents and Trademarks